UNITED STATES PATENT OFFICE.

HENRY KELLOGG, OF NEW HAVEN, CONNECTICUT.

PROCESS OF MAKING WATER-PROOF COMPOSITIONS FROM LINSEED-OIL.

SPECIFICATION forming part of Letters Patent No. 455,286, dated June 30, 1891.

Application filed March 15, 1889. Serial No. 303,459. (No specimens.)

*To all whom it may concern:*

Be it known that I, HENRY KELLOGG, of New Haven, in the county of New Haven and State of Connecticut, have invented new Improvements in Methods of Treating Oil for Waterproofing and like Purposes; and I do hereby declare the following to be a full, clear, and exact description of the same.

This invention relates to the preparation of oil, adapting it to be applied to the waterproofing of various articles and materials, it also having the properties of preserving many articles to which it may be applied; and the invention consists in the preparation of the oil, as hereinafter described.

The oil which I use is a good linseed, either raw or boiled, that known in commerce as "boiled oil" being preferred, for the reason that the litharge, red-lead, or peroxide of manganese used in its preparation removes some of the impurities of the raw oil.

I first subject the oil to boiling in a dilute nitric-acid bath. The primary strength of the acid is not material; but the bath into which it enters should preferably have a specific gravity of between three or four degrees Baumé acid test. The quantity of acid used in making such a bath will of course depend upon its strength. The boiling of the linseed-oil in this nitric-acid bath is continued for from three to five hours. If the bath is weak, a longer time will be required for the boiling oil. On the other hand, if the bath is strong the oil will not have to be boiled as long; but when the bath is strong the product will be tough and very difficult to dissolve. The result of this boiling is oxidation of the oil, which is left in the form of a spongy tenacious yellowish gum. I then, second, immerse this gum in clear cold water and knead it to wash out the nitric acid to a considerable extent, and then immerse it in a bath of very dilute ammonia-water to neutralize any nitric acid that may remain in the gum, and then immerse it in fresh water to wash out the ammonia. The ammonia bath is not necessary, as if sufficient time and kneading be given to the gum in the water the nitric acid will be removed, it only being essential that the gum shall be so treated after coming from the acid bath as to substantially remove the nitric acid. When the acid is so removed, the gum is placed upon a drip-table or in any convenient position whereby the water from the bath may drain from the gum. When thoroughly dripped, the gum is, third, cut or sliced into thin pieces. This is best done by the employment of a machine well known as a "dried-beef" cutter, and the slicing is best performed in the same manner as in slicing beef into thin pieces. As these thin pieces fall from the machine they are permitted to drop into spirits of turpentine or other solvent contained in a vessel prepared for the purpose. It is important that this bath of spirits of turpentine or other solvent should be provided, so that the cuttings may immediately drop therein as they are cut from the mass; otherwise the cuttings will adhere to each other, so as to re-form into the original mass. If this is permitted, it will be very difficult to dissolve or bring it into a condition for practical use, because the gum is so persistently adhesive at this time. The purposes of the solvent bath are for further disintegration. After thus cutting the mass of gum into the solvent-bath, this solvent with the gum is then, fourth, subjected to a disintegrating operation, which is best performed by the employment of revolving beaters or cutters, operating substantially like what is known as the "Dover egg-beater," or like an "ice-cream freezer," having oppositely-directed blades which will work through the mass of gum in the solvent. This operation thoroughly agitates, cuts, and mixes the solvent and gum, and the operation is continued until thorough disintegration is attained. When this thorough disintegration of the gum in the solvent has been attained, the mass is then, fifth, ground, preferably employing for the purpose a paint-grinding mill. This grinding operation reduces the mass to a creamy consistence. After this grinding operation, sixth, the material is poured into a boiler, which is set within another boiler, the said other boiler being of enough larger capacity to contain a considerable quantity of water, the inner boiler being supported so that the water in the outside boiler will entirely surround the inside boiler—that is, what is commonly called a "jacketed" boiler. I prefer that the water in the outer boiler shall be salted, or that some liquid be employed therein which will permit a higher temperture than 212° Fahrenheit. The material is boiled until perfectly dissolved, and is brought to a condition resembling a heavy varnish. This result is attained in about one hour. During this boiling operation a considerable portion of the spirits of turpentine or solvent is thrown off by evaporation. This may be condensed by applying to the boiler the usual still-worm, not necessary to be described in this specification, as it is immaterial to the invention whether the vaporized spirits be preserved or not. The material thus produced is now ready for use, and is in itself a very good drier; but if desirable to improve the drying properties, I subject it to another boiling under a much higher degree—say from 275° to 280° Fahrenheit—and while thus boiling introduce litharge, red lead, or peroxide of manganese, all such driers naturally in the oil having been destroyed by the action of the nitric acid in the first stage of the process. With this drier added the material becomes a very quick drier. Pigments may be added to give it any desired color or body. It is very elastic, and its elastic qualities are not changed by heating to 500° Fahrenheit. Neither does it congeal if submitted to a temperature far below zero. When heated to 212° Fahrenheit, this material is a thin liquid and will penetrate the finest textile fabrics. To apply this liquid for waterproofing fabrics, it is best heated to, say, 212° Fahrenheit, and the fabric drawn through a bath of the material, the surplus being removed by pressure-rolls or otherwise. It clearly penetrates any fabric, so that the fabric, becoming thoroughly saturated with the liquid and dried, is very flexible and thoroughly impervious to air or water and does not expand or contract to any appreciable extent under any circumstances, and always remains soft and pliable. It resembles india-rubber to a considerable extent, but has not the same elastic capacity as india-rubber, although very elastic. It differs from all varnishes in that, though a product of oil, it will not readily harden.

The application of this prepared linseed-oil for waterproofing fabrics will be sufficient to enable others skilled in the art to which the invention pertains to apply the same to filling or coating other materials or articles.

I claim—

1. The herein-described improvement in the method of treating linseed-oil for waterproofing purposes, which consists in, first, boiling linseed-oil in a nitric-acid bath until it reaches a gum-like condition; second, subjecting the gum to a bath for the removal of the acid; third, cutting the gum in a solvent-bath; fourth, disintegrating the said gum with the solvent; fifth, grinding the disintegrated mass, and, sixth, boiling the thus-ground material, substantially as described.

2. The herein-described improvement in the method of treating linseed-oil for waterproofing purposes, which consists in, first, boiling the linseed-oil in a nitric-acid bath until it reaches a gum-like condition; second, subjecting the gum to a bath for the removal of the acid; third, cutting the gum in a solvent-bath; fourth, disintegrating the said gum with the solvent; fifth, grinding the disintegrated mass; sixth, boiling the thus-ground material, and, seventh, subjecting the same to another boiling, adding to the mass a drier during this last boiling operation, substantially as described.

HENRY KELLOGG.

Witnesses:
FRED. C. EARLE,
LILLIAN D. KELSEY.